US008117505B2

(12) United States Patent
Sridharan et al.

(10) Patent No.: US 8,117,505 B2
(45) Date of Patent: Feb. 14, 2012

(54) RESOURCE EXHAUSTION PREDICTION, DETECTION, DIAGNOSIS AND CORRECTION

(75) Inventors: Baskar Sridharan, Redmond, WA (US); Elsie Nallipogu, Seattle, WA (US); Abdelsalam Heddaya, Bellevue, WA (US); Mario R. Garzia, Redmond, WA (US); Björn Levidow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

(21) Appl. No.: 11/267,990

(22) Filed: Nov. 7, 2005

(65) Prior Publication Data

US 2007/0106636 A1 May 10, 2007

(51) Int. Cl.
*G06F 11/00* (2006.01)

(52) U.S. Cl. ....... 714/47.2; 702/182; 702/183; 702/184; 702/185; 702/186; 700/108; 700/109; 700/110; 718/104; 718/105

(58) Field of Classification Search .................. 702/182, 702/183, 184, 185, 186, 187, 188; 718/104, 718/105; 714/47; 700/108–109
See application file for complete search history.

(56) References Cited

U.S. PATENT DOCUMENTS

| | | | |
|---|---|---|---|
| 6,397,252 B1 * | 5/2002 | Sadiq | 709/226 |
| 6,594,784 B1 * | 7/2003 | Harper et al. | 714/47 |
| 6,629,266 B1 * | 9/2003 | Harper et al. | 714/38 |
| 6,810,495 B2 * | 10/2004 | Castelli et al. | 714/47 |
| 7,054,943 B1 * | 5/2006 | Goldszmidt et al. | 709/229 |
| 7,243,267 B2 * | 7/2007 | Klemm et al. | 714/38 |
| 7,530,072 B1 * | 5/2009 | Cheaz | 718/104 |
| 2002/0087734 A1 * | 7/2002 | Marshall et al. | 709/310 |
| 2002/0144178 A1 * | 10/2002 | Castelli et al. | 714/15 |
| 2003/0023719 A1 * | 1/2003 | Castelli et al. | 709/224 |
| 2003/0100957 A1 * | 5/2003 | Chaffee et al. | 700/18 |
| 2003/0126184 A1 * | 7/2003 | Austin | 709/105 |
| 2004/0078657 A1 * | 4/2004 | Gross et al. | 714/15 |
| 2004/0177245 A1 * | 9/2004 | Murphy | 713/100 |
| 2005/0033846 A1 * | 2/2005 | Sankaranarayan et al. | 709/226 |
| 2005/0132032 A1 * | 6/2005 | Bertrand | 709/223 |
| 2005/0165921 A1 * | 7/2005 | Abadir et al. | 709/223 |
| 2006/0129687 A1 * | 6/2006 | Goldszmidt et al. | 709/229 |
| 2007/0083794 A1 * | 4/2007 | Yu | 714/38 |
| 2007/0106636 A1 * | 5/2007 | Sridharan et al. | 707/2 |

* cited by examiner

*Primary Examiner* — Robert Beausoliel, Jr.
*Assistant Examiner* — Jeison C Arcos (57) ABSTRACT

Resource exhaustion is anticipated, a cause of the resource exhaustion is identified and options are identified to address the resource exhaustion.

20 Claims, 9 Drawing Sheets

RESOURCE EXHAUSTION PREDICTION, DETECTION, DIAGNOSIS AND CORRECTION

BACKGROUND

An operating system currently detects the exhaustion of resources when an allocation request is received i.e., it will fail the request when the resource is exhausted and attempts to return a corresponding error code to the requestor. In some cases, an event is also logged for future analysis. The operating system does not resolve the exhaustion situation on its own. Instead, the onus of handling this condition is left to the process or component that made this request. Using the Windows™ operating system as an example, when the commit charge is near the current commit limit and a request is made to allocate committed memory, if the request will push the commit charge beyond the current commit limit, the operating system increases the current limit. This process continues until the commit limit reaches the maximum value which is a factor of the size of physical memory and the maximum size of all the paging files. At this point, the commit limit is said to be exhausted and all requests for allocating memory will fail. Hence, critical system processes or services, or other components may crash, leading to loss of control and data.

SUMMARY

Resource exhaustion is anticipated, a cause of the resource exhaustion is identified and options are identified to address the resource exhaustion. Resource exhaustion may be predicted by looking at the properties of a resource, looking at historical data for a single device over a period of time or looking at aggregate data across a plurality of client devices. The properties of the resource may include the usage of the resource, the capacity of the resource and the dependencies between resources. Causes of resource exhaustion may be identified by detecting which components are using a large percent of the resource, by detecting which components are most rapidly increasing its use of the resource or by a combination of these and other methods of detection. The solution to resource exhaustion may be identified by allowing the operating system to dynamically allocate the resource, by allowing the operating system to close some components, by allowing the components to negotiate or release the allocation of the resource or by allowing the user to select which component to close to free up the resource. The solutions may depend on whether the resource is preemptible or non-preemptible.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
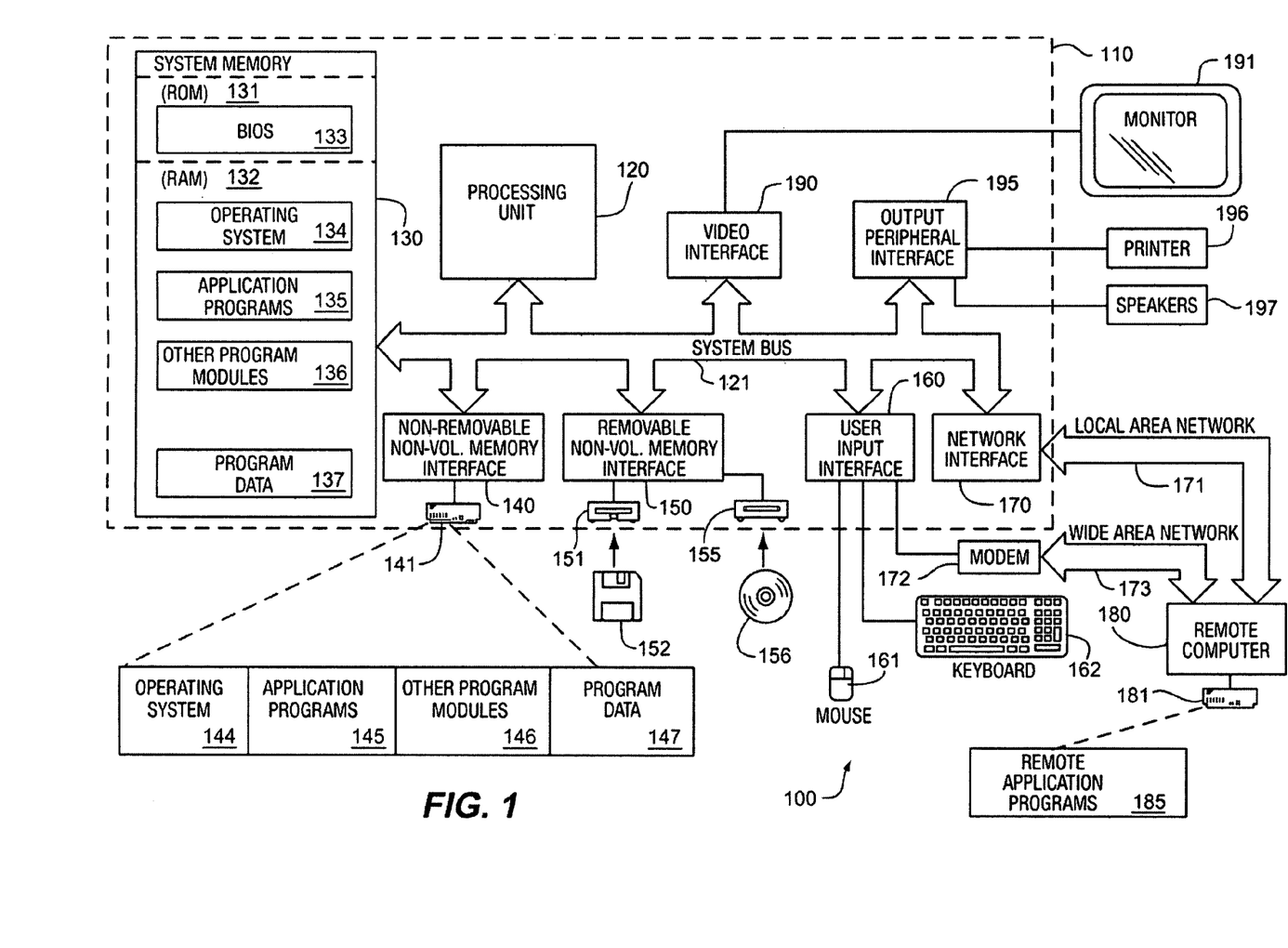
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, networking devices, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component. Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards,. digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs or components 145, other program modules 146, and program data 147. Note that these components can either be the same as or different from operating system 134, application programs or components 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
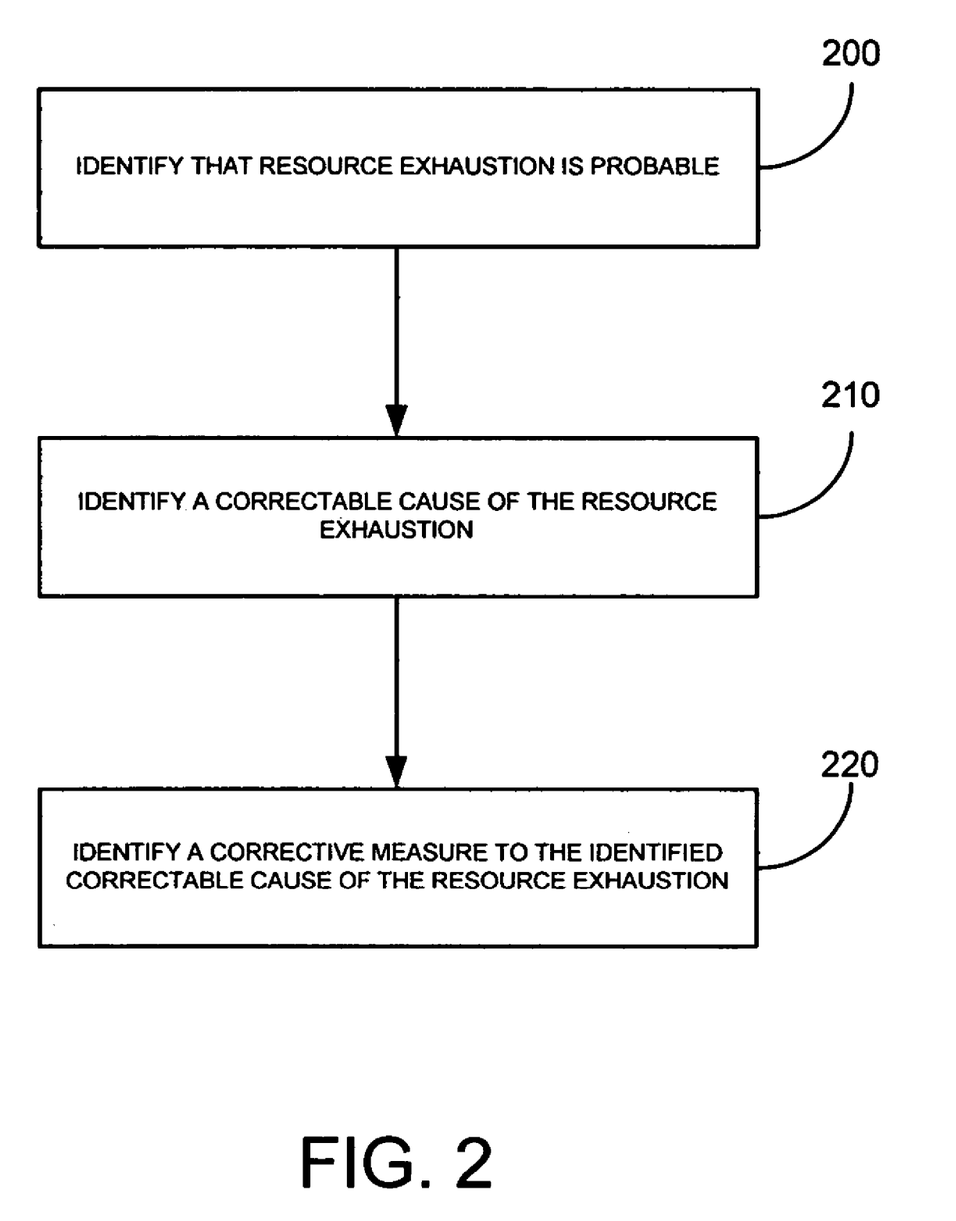
FIG. 2 is a flowchart of a method in accordance with the claims.

FIG. 2 may illustrate a method of handling resource exhaustion in a computer. The resource may be virtually any resource. Examples of possible resources include virtual memory, the desktop heap, disk storage, processor capacity, disk I/O bandwidth, and network bandwidth as described in previous paragraphs. In addition, resources are not necessarily physical items. For example, the virtual address space is not a physical, tangible item, but may be considered a resource.

Exhaustion may have several forms:

Quantity Exhaustion: This exhaustion mode may occur due to (a) leaks, and (b) over-consumption, and (c) under-provisioning.

Granularity Exhaustion: This exhaustion mode may occur due to (a) fragmentation (or partitioning of the resource), and (b) quantity exhaustion.

Other: This exhaustion mode may occur due to an invalid request for allocation.

Identify resource exhaustion

Figure 3:
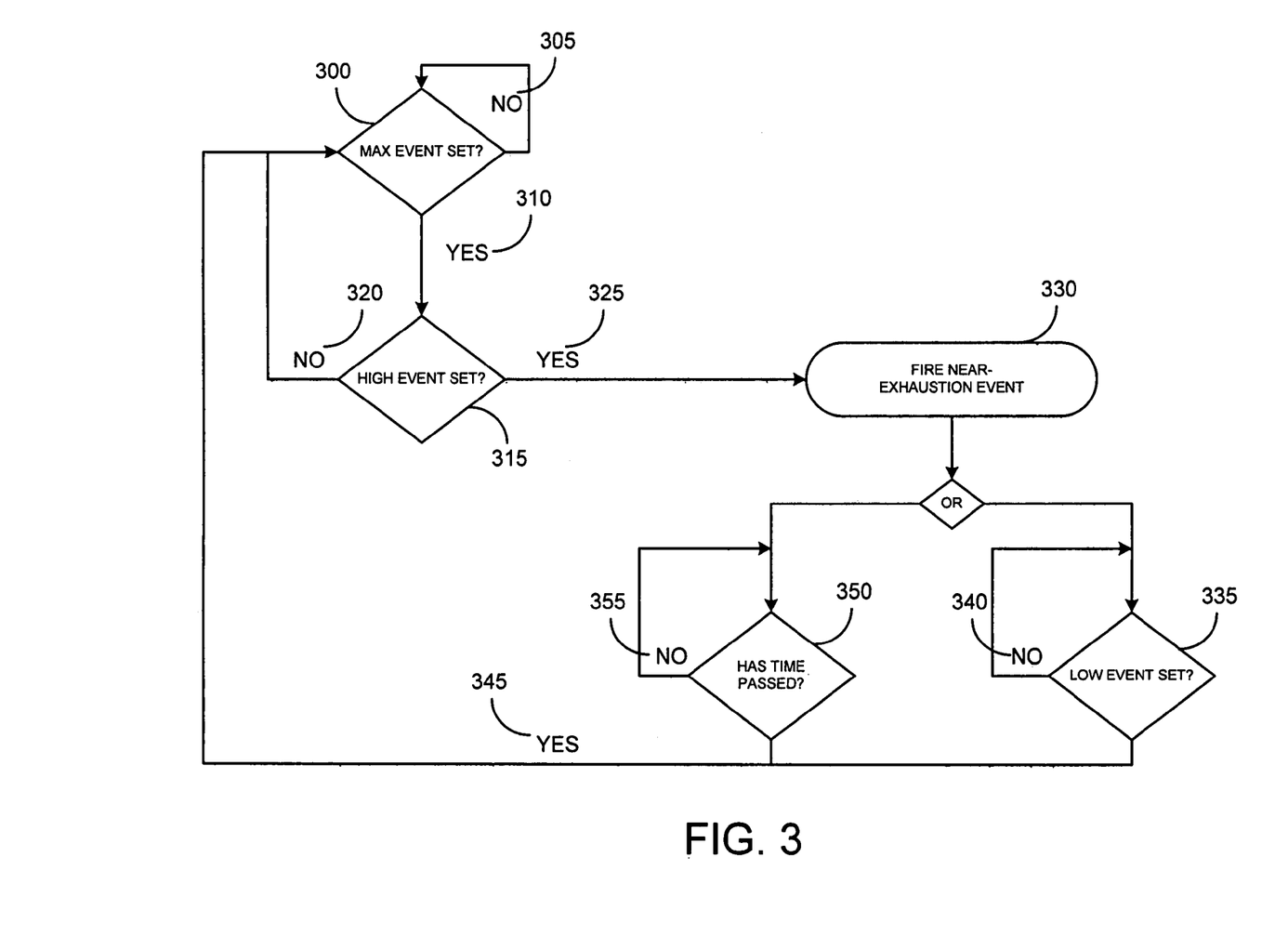
FIG. 3 is a flowchart of a method of identifying resource exhaustion in accordance with the claims.

At block 200, the method may identify that resource exhaustion is probable. In effect, the method may be predicting that resource exhaustion is probable. FIG. 3 may be an illustration of one method of identifying exhaustion. At a high level, resource exhaustion may be predicted by looking at the properties of a resource, looking at historical data for a single computer over a period of time or looking at aggregate data across a plurality of computers. The properties of the resource may include the usage of the resource, the capacity of the resource and the dependencies between resources. Other attributes may include:

Scope: May specify the various scopes in which the resource is available. The possible scopes may include: (i) system; (ii) session; and (iii) process. For example, Virtual Address Space has a process scope, while the Pagefile has a system scope.

Preemptibility: May specify whether the Operating System can free some of the resource without the owner (the one who allocated the resource) playing any role in it. If the resource is preemptible, the preemption may be either forced or voluntary.

Capacity: May specify the maximum quantity of this resource that can be allocated in each scope. For example in the Windows™ Operating System, while there is a limitation of a maximum of 1000 GDI Objects per-process, there is no such explicit limit on the system scope.

Consumption: May specify the amount of resource that has currently been allocated .

Granularity: May specify the granularity in which the resource can be consumed and freed such as fixed or variable.

Contiguousness: May specifies whether the requested quantity is allocated contiguously or not.

Ownership: May identify the owner for each allocation of the resource.

Security: May specify the types of operations that can be performed on the resource.

Name: May specify a name of an instance of the resource.

Queuing: May specify if the resource can queue requests for allocations.

Referring again to dependencies, if a first resource is dependent on a second resource, and if the second resource is near exhaustion, exhaustion may be predicted for the first resource.

Block 300 is an example of predicting resource exhaustion by analyzing thresholds based on the usage and capacity of the resource. In this case, read/write virtual memory is used as the example resource. When the Windows Operating System is used as an example, the total read/write virtual memory used is referred as the commit charge, and the commit charge at a given point in time cannot exceed the commit limit in effect at that time. At block 300, the method may determine whether a max event indicator is set. The max event may be set when the current commit limit is equal to the maximum possible commit limit for a resource and a high event is set. Additional threshold levels may be set such as a low threshold, a medium threshold and a high threshold. The max event may be cleared when the current commit charge falls below a certain percentage of the maximum possible commit limit. If the max event is not set, the no branch 305 may return control to block 300. If the max event is set, the yes branch 310 may lead to a determination at block 315 of whether a high event is set. A high event may be set when the current commit charge for a resource rises above a threshold. The threshold may be a percentage of the current commit limit. In one example relating to virtual memory, the high threshold may be 90% of the maximum commit limit set by the memory manager. The high event may be cleared when the current commit charge falls below the threshold of the current commit limit. If the high event is not set, the no branch 320 may pass control to block 300. If the high event is set, the yes branch 325 may lead to the fire a near exhaustion event at block 330. FIG. 4 may be an illustration of what may occur when the near exhaustion event is fired and is described later.

After the fire near exhaustion event 330 is complete, the method may take one of two paths. A first path at block 335 may make a determination whether a low event has been set. A low event may be when the current commit charge has fallen below a low event threshold meaning the corrections identified in FIG. 4 have been successful in reducing the commit charge for the resource. If the determination is no, the no branch 340 may lead back to block 335. A yes determination may lead to the yes branch 345 which may pass control to block 300. A second path may determine at block 350 whether a certain period of time such as a minute has passed. If the determination is no, the no branch 355 may lead to block 350 where the method may loop until a sufficient period of time has passed for the correction identified in FIG. 4 to work. If the determination is yes, the yes branch 345 may pass control to block 300. By waiting a period of time, repeat alarms based on the same exhaustion may be squelched.

Other methods of determining resource exhaustion are possible. In one example, historical trend analysis may be used to identify when a resource exhaustion is probable. Trend analysis is known in the art and is used widely to study things as divergent as the stock market to causes of diseases and may be applied to predicting exhaustion. For example, previous experience may make it known that after sufficient applications are open, resource exhaustion may be likely. The method may correlate combinations of components with exhaustion and may use the correlation to predict exhaustion. The trend may be from the time the component session is started or the trend analysis may review previous interactions of programs to determine whether resource exhaustion is probable. The trend may also extrapolate data. For example, if the growth in usage of a resource is such that if it continued at the current rate resource exhaustion would occur, then resource exhaustion may be predicted. Similarly, if there is a pattern of resource exhaustion that exists, this pattern may be used to predict exhaustion. For example, if usage of a resource grows, drops, grows and then does not drop, exhaustion may be predicted. The trend analysis data may be stored by the method and referred to in making predictions when resource exhaustion is probable. Other situations may also be handled in a logical manner. For example, if a near-exhaustion event is received while one is being diagnosed then that event may be ignored.

Figure 5:
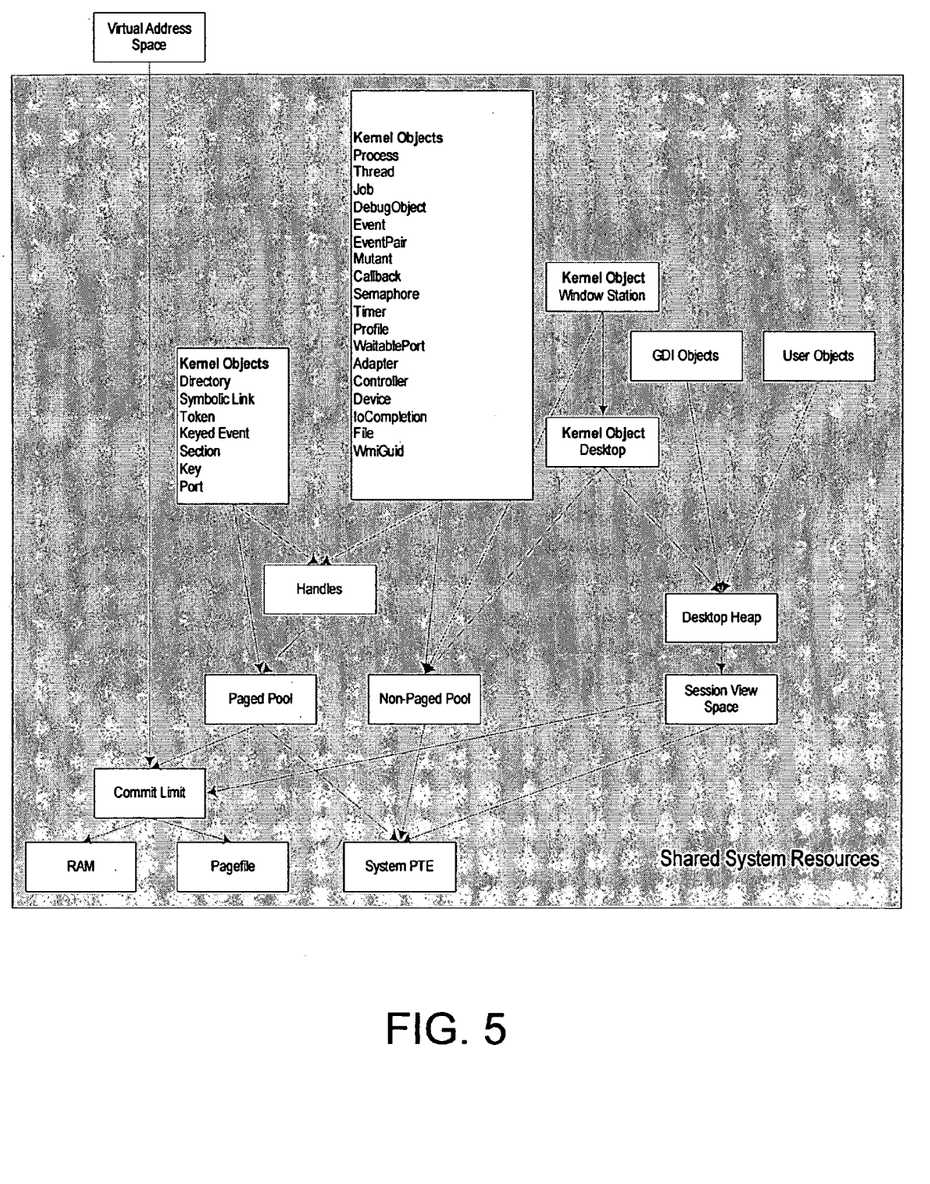
FIG. 5 may be an illustration of a dependency graph.

The thresholds may be set for individual components or may be tracked by the operating system. In addition, the method may watch resources that are dependent upon each other. For example, exhaustion of a dependent resource may be predicted when an antecedent resource exhaustion has been detected. As a further example, in the Windows operating system, allocating a User Object such as a Window may entail the allocation from the associated Desktop Heap of the process. In turn, the Desktop Heap itself may be allocated from Non-paged Pool. Hence, when an allocation request for a particular resource fails, the analysis to determine the cause for the exhaustion may be performed recursively on the current resource and all the dependent resources. For example, if a User Object creation fails, it may be due to the process reaching the limit, or due to exhaustion of the Desktop Heap. An analysis of the Desktop Heap exhaustion may in turn focus on Non-Paged Pool exhaustion. A partial resource dependency graph is shown in FIG. 5. In FIG. 5, a solid arrow from resource R1 to R2 may imply that R1 is dependant on R2.

Figure 6:
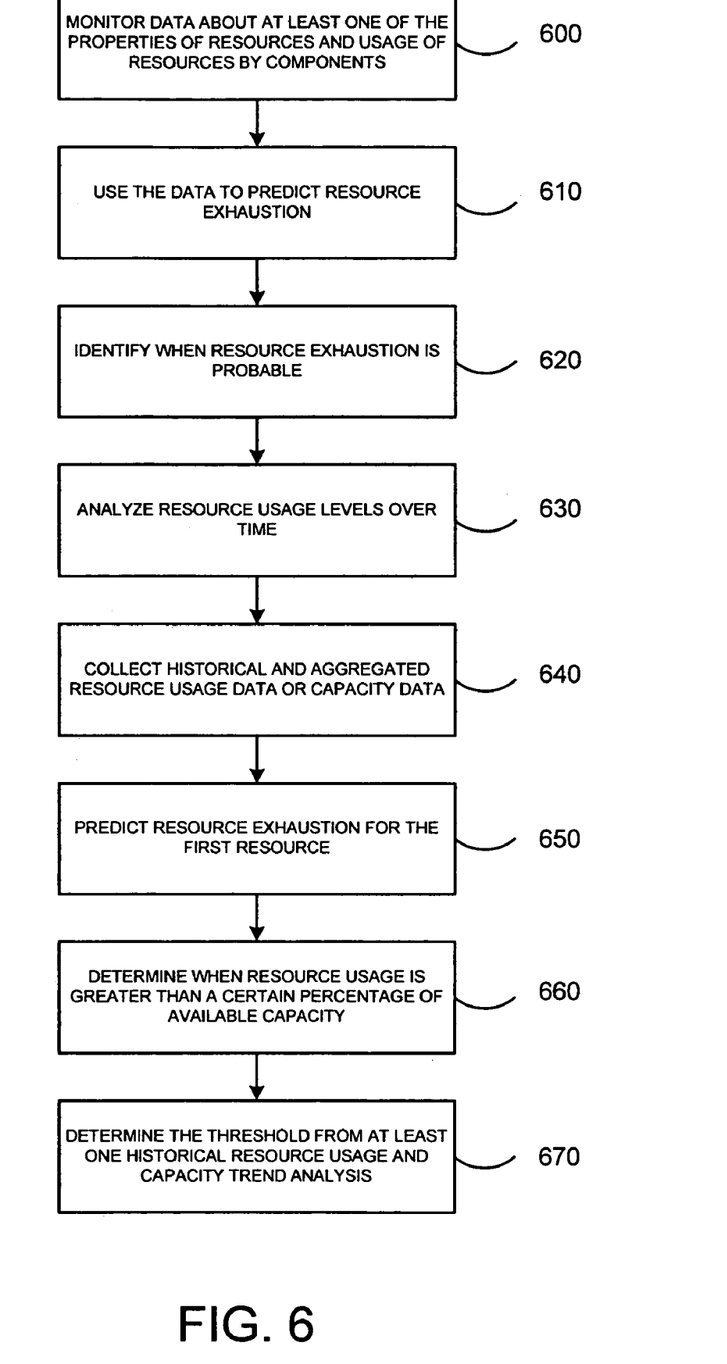
FIG. 6 may be an illustration of a flowchart of a method of predicting resource exhaustion.

FIG. 6 may be another illustration of a method of identifying resource exhaustion, many of the elements which were previously described. At block 600, the method may monitor data about a resource. At block 610, the method may compare the resource data to a threshold. At block 620, if the resource data is greater than the threshold, the method may identify that resource exhaustion is probable. At block 630, the method may identify when resource exhaustion is probable when a resource is exhausted beyond a configurable percentage. At block 640, the method may collect the resource data once a component session is started. At block 650, the method may collect resource data over a plurality of instances that the component session is operating. At block 660, the method may determine that the threshold is a usage level of the resources that has caused a problem in the past. At block 670, the method may create the threshold by calculating historic norms for usage of the resources. At block 680, the method may create the threshold using historical user behavior.

Identify A Cause And Identify A Solution

Referring again to FIG. 2, at block 210, the method may identify a correctable cause of the resource exhaustion and at block 220 the method may identify solutions to the identified correctable resource exhaustion. An overall philosophy may be to shut down or limit as few of components as necessary to alleviate the resource exhaustion problem. Some causes may not be correctable. For example, if a piece of hardware memory has failed and memory exhaustion is a result, this failure cannot be corrected without physically replacing the hardware and is not considered a correctable cause of resource exhaustion. On the other hand, a component leaking memory (holding onto memory that it will never use) may be stopped, making this a correctable problem FIGS. 4a and 4b may be an illustration of a flowchart of one method that identifies resource exhaustion causes and identifies resources exhaustion remedies.

At block 400, the near exhaustion event may be triggered as described in relation to FIG. 3. At block 405, the method may identify a given number of the largest users of the resource. In one example, the method may identify the three largest consumers of the resource. In another example, the method may identify the single largest consumer of the resource. In yet a further example, the method may identify enough consumers of the resources until a certain percentage of the resource usage has been identified. For example, the method may identify enough resource consumers until 10% of the resource use has been identified or identify enough consumers to reduce resource usage below a selected threshold. In yet another example, the method may identify a given number of consumers that have the greatest increase in the use of the resource. For example, if a component is stuck in a loop, it may continually increase its use of a resource and it may need to be stopped in order to avoid resource exhaustion. The manner of identifying the resource consumers is virtually limitless.

Figure 4A:
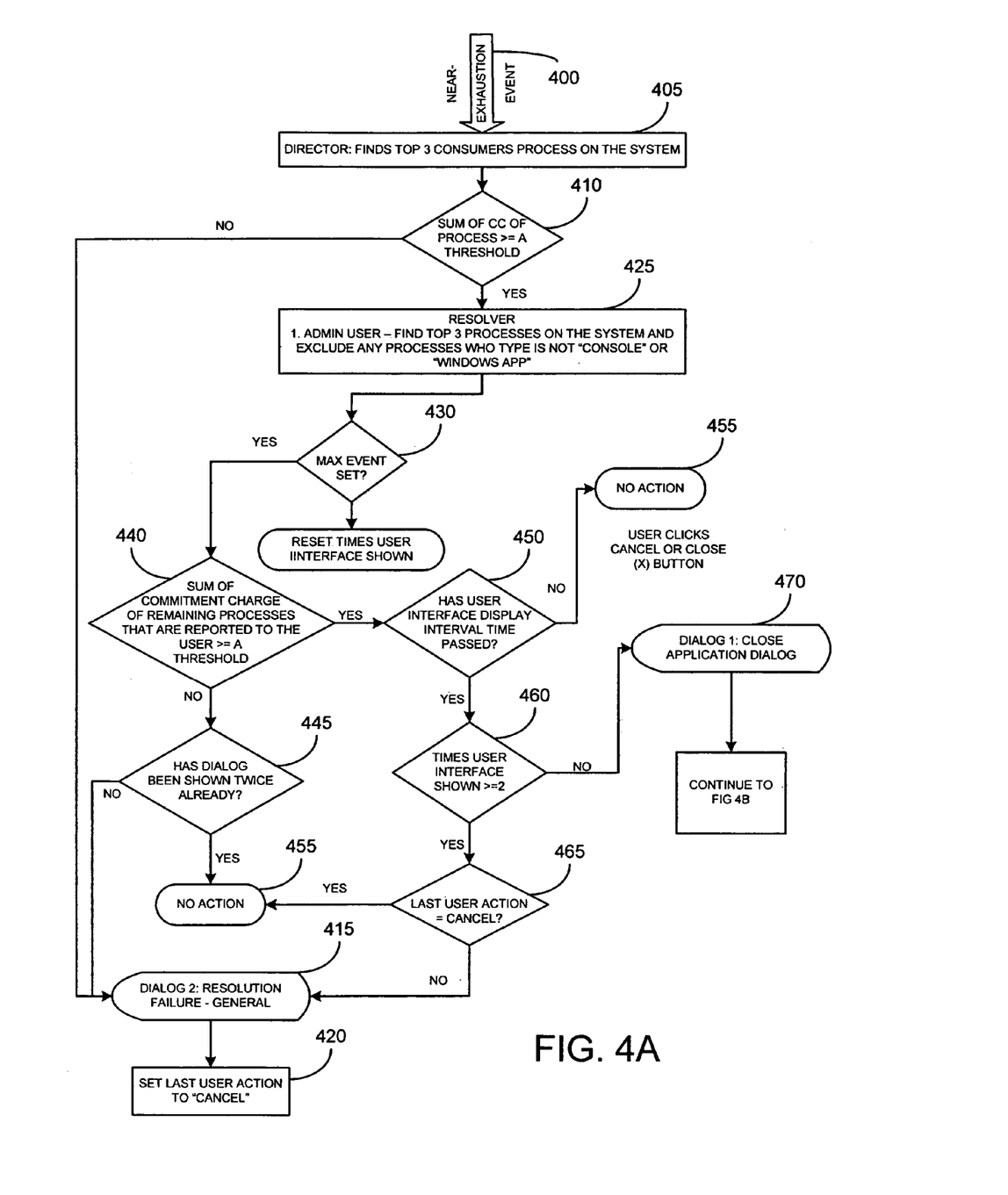
FIGS. 4a and 4b are a flowchart of a method of identifying causes of resource exhaustion and identifying corrections to address the resource exhaustion.

At block 410, the method may determine whether the commit-charge of the identified resource users is greater than 10% of the total resource usage. If the determination is negative, the method may pass control to block 415 where the method may display to the user that the attempt at resolving the resource exhaustion has failed. The display may describe the problem to the user such as the system is low on the resource and that the method could not repair the problem. The method may then make some recommendations to the user such as suggesting that the user restart the machine or that the user should save their work and request that other users of the system reduce their use of the resource. In addition, the method may suggest that the user close some components or take other action depending on the resource. If the resource is virtual memory, then the method may suggest that the user increase the size of the pagefiles, for example. Control may then proceed to block 420 where the method may track that the last user action was to cancel the method.

If the determination at block 410 is yes, control may pass to block 425 where the method may find the top resource user on the system that is an operating system process. As mentioned previously, the method may be adapted to other systems and is not just limited to operating systems or processes that are part of an operating system. Operating systems may be one example for the method. In a Windows based system, the processes may be a Windows Application process or a console component. This may be a further review of the resources identified at block 405. Similarly, the method may identify one resource, several resources or a number of resources that total a certain percentage of the resource use. In yet another embodiment, the method may identify the processes that have the greatest increase in usage of a resource during a given period of time. As another example, resource dependencies may be reviewed. Other method of identifying resources consumers are possible and are contemplated by this application. Control may pass to block 430.

At block 430, the method may determine whether the max event has been set at block 300 in FIG. 3. The technique of using the max, high, and low event is an example of how the resource usage and capacity property may be used for predicting and identifying the case of an exhaustion. A different technique may be used for predicting and detecting exhaustion using trend analysis, for example. If the max event has not been set, at block 435, the method may reset the counter for the number of times that the user interface has been displayed and the method may end. If the max event has been set, control may pass to block 440 where the method may determine whether the sum of the resource commit-charge of the remaining processes are greater than a threshold, such as 10% of the maximum commitment limit for the resource. If the determination is no, control may pass to block 445 and if the determination is yes, control may pass to block 450. At block 445, the method may determine whether the method has already displayed a given number of warnings to the user previously, such as two times. If the determination is yes, control may pass to block 455 where the method may take no action as the user has already been a given number of opportunities to address the resource exhaustion problem.

Figure 4B:
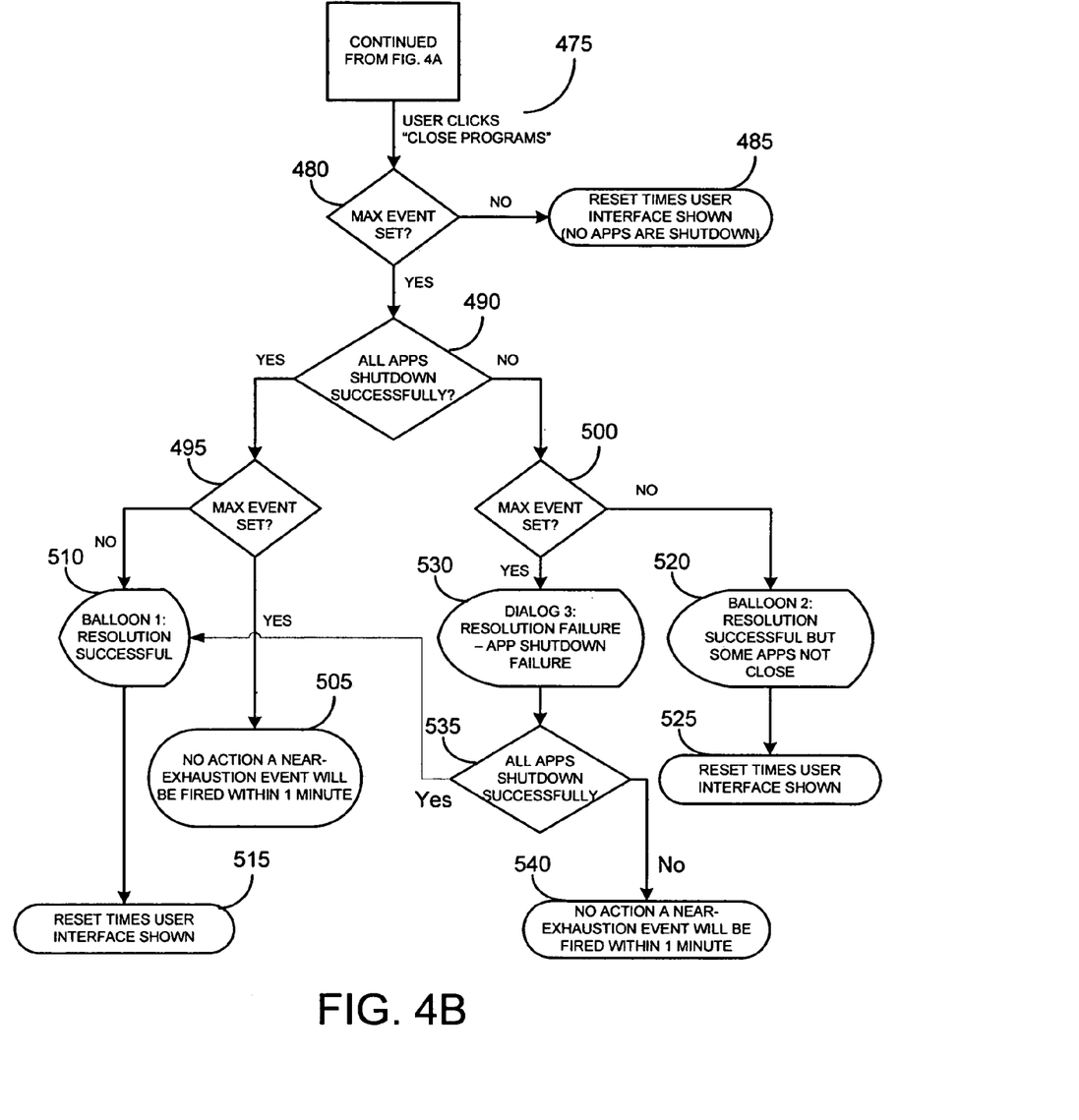

Returning again to block 450, the method may determine whether the method has displayed a resource exhaustion user interface in a given period of time, such as five minutes. If the user interface has not been displayed for the given period of time, control may pass to block 455 where the method may take no action. If the user interface has been displayed in a given period of time, control may pass to block 460 where the method may determine how many times the user interface has been displayed. If the method has displayed the user interface at least a certain number of times, such as two times, control may pass to block 465 and if the user interface has not been displayed a certain number of times, control may pass to block 470. At block 465, the method may determine whether the last user action was to cancel the user interface to address resource exhaustion. If the determination is yes, control may pass to block 455 where the method may take no action. If the determination is no, control may pass to block 415 where an interface may be displayed that there has been a general resolution failure and the method may store that the last user action was to cancel the resource exhaustion method.

At block 470, an interface may be displayed to the user to allow the user to take steps to close some components to address the resource exhaustion problem. One of the options in the interface may be an option for the user to select to close some components. The interface may use the common title of the components that a user may close. Another option may be to close a certain number of components, such as the three top consumers of the resource or the three fastest growing consumers of the resource as discussed previously. At block 475, the user may select to close one or more components. At block 480, the method may determine whether the max event of block 300 (FIG. 3) has been set. If the determination is no, control may pass to block 485 where the method may reset the times the user interface has been displayed and the method may end. If the determination is yes, control may pass to block 490.

At block 490 the method may determine whether all the components the user selected to close were successfully closed. If the determination is yes, control may pass to block 495 and if the determination is negative, control may pass to block 500. At block 495, the method may determine whether the max event of block 300 (FIG. 3) has been set. If the determination is yes, control may pass to block 505 and if the determination is no, control may pass to block 510. At block 505, the method may take no action as a near exhaustion event will be fired shortly, such as within a minute. At block 510, the method may display to the user a display that the resource exhaustion resolution was successful. The message may also mention that it is safe to continue to use the system and that there are steps that the user can take to avoid this condition in the future. Control may pass to block 515 where the method may reset the number of times the user interface has been displayed. The number of times the user interface has been displayed may also be reset if a longer period of time has passed such as 24 hours or if the user logs off the system.

Returning to block 500, the method may determine whether the max event of block 300 (FIG. 3) has been set. If the determination is no, control may pass to block 520 where the method may inform the user that the resolution was successful but that some of the selected components did not close. The display may also provide a list of the components that could not be closed and may provide suggestions on how to avoid the exhaustion condition in the future. At block 525, the number of times the user interface has been displayed may be reset. If the determination at block 500 is yes, at block 530 the method may display to the user that there was a resolution failure as one or more of the selected components did not successfully close. The display may list the components that failed to close properly. The method may also suggest that the user save their work, that the user should try to close certain components manually or to use a task manager type option to close the component. At block 535, the method may determine whether all the selected components closed successfully. If the determination is no, the method may take no action as a near exhaustion event may be fired shortly, such as within a minute at block 540. If the determination is yes, the method may indicate that it is safe to use the computer at block 510.

Since the user was shown which corrective measures to take (such as "Close applications"), any resource exhaustion events that are received at a time that is less than or equal to five minutes since the "Close applications" interface was displayed may be ignored. Similarly, if an event is received after diagnosis but while correction is completing then that event may be ignored.

In another embodiment, the method may negotiate with the various components to release (or back off) some of the resource. The components may have to have an interface to accept the request to release some of the resource. The method may have a variety of ways to determine which component should give up some of the resource. One way may be to identify which component is the biggest user of the resource and request that it release some of the resource. Another way may entail analyzing which component the user is using primarily and asking the secondary components to reduce resource use.

In yet a further embodiment, the method may negotiate among the resources to determine which component should close. Some components may be legacy components and will not recognize a request to release resource. Accordingly, the method may determine whether to simply close the legacy component or to negotiate with the components that do recognize the release resources request to free up sufficient resources for the system to continue.

In another embodiment, the method may select target components when exhaustion is detected based on the biggest consumers, historical usage and aggregate data. Other manners of selecting target resources are within the scope of the method.

In another embodiment, the method may impose limits or quota on usage of resources by various components. The limits on resources may be static or may be dynamic. For example, as more components are opened, the resource limit for each component may be reduced. Similarly, as components are closed, the resource limit for each component may be increased. In addition, limits may be imposed only when exhaustion is predicted. A variety of methods may be used to set the dynamic limit. For example, if a user is using a primary component, the method may allocate addition resources to the primary component and allocate fewer resources to the secondary components. The method may also add resource quotas to one component but not to others.

In addition, a first device may report results of exhaustion prediction, exhaustion cause identification and exhaustion cause correction to other devices. The method may also report the results to administrators. In all situations, information learned from one device may be used to address similar situations in other devices.

The method may be easily adapted to a system that has several users. The method may be instantiated for each user. If one user has a higher permission level such as an administrator, the method may first ask the administrator how the resource exhaustion should be handled. The method may also provide different corrective actions for different users. For example, the corrective actions may depend on the privileges of the users.

The method may keep data on the prediction of resource exhaustion, the cause of the resource exhaustion and the results of the resolution of the exhaustion. This data may be reported back to the operating system creator or component creator such that the operating system or component may be improved over time by reviewing the accumulated data. In addition, the data may be analyzed offline such that the user's computer will not be bogged down with the analysis and the analysis may be shared with as many users as possible.

The method may be faced with resources that are preemptible and some that are non preemptible. For example, CPU usage is preemptible because the operating system can take away CPU usage and make a given application wait for another application. This delay likely will not have a negative effect on the user. On the other hand, once memory is allocated to a process (application), it cannot be taken away without (i) the process freeing the memory on its own, or (ii) the process terminating. In general, the processes termination itself may be differentiated based on whether it is clean or dirty. In some systems, forcefully taking the memory away from the application, without using option (i) or (ii), may result in loss of control and data, and could have a negative impact on the user. It is possible to enforce (i) automatically by negotiating with the process, without any user intervention. Option (ii) may be used automatically, by cleanly terminating the process, or by using a mechanism similar to "Close Applications" interface wherein the user saves the work and then terminates the application, either cleanly or otherwise. Dirty termination of the process without user consent may likely cause a negative impact. Hence, applications for which dirty termination is the only option may only be corrected with a likely negative result.

Figure 7:
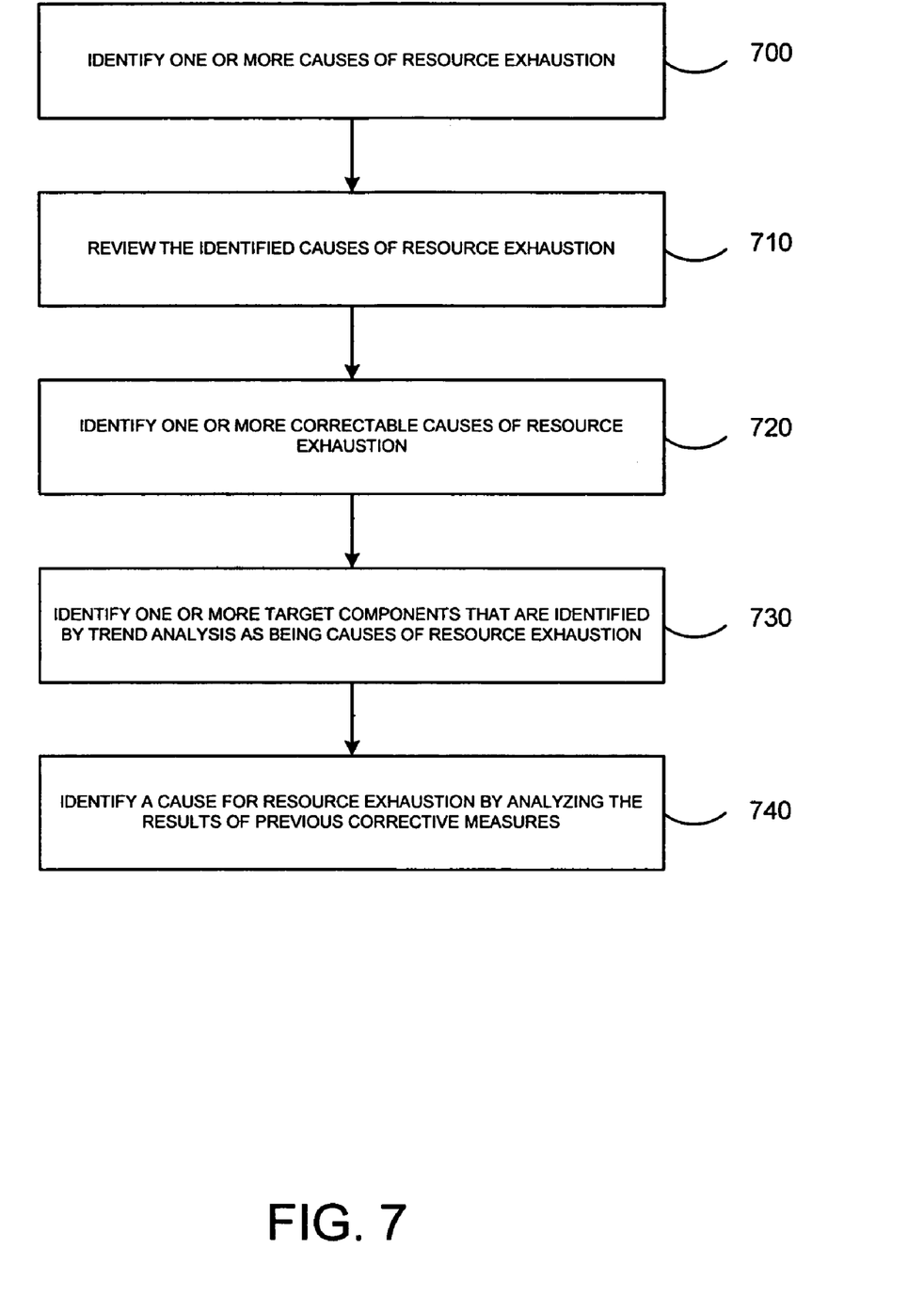
FIG. 7 may be an illustration of a flowchart of a method of determining a correctable cause of resource exhaustion.

FIG. 6 may illustrate a method of resource management in a computer. At block 600 the method may monitor data about a resource or usage of resources by a component. At block 610, the method may use the data to predict resource exhaustion. At block 620, the method may identify when resource exhaustion is probable when a resource is exhausted beyond a configurable percentage. For example the percentage may be 90% or may be set by a user, an administrator or by the method itself. At block 630, the threshold may be determined from at least one of historical resource usage and capacity trend analysis (which was discussed previously). For example, if past experience indicates exhaustion is probable at 80% of capacity, exhaustion may be predicted when a resource is at 80% of capacity. At block 640, the method may analyze resource usage levels over time to determine whether resource exhaustion is probable. For example, resource usage at 75% of capacity in the past may not have caused exhaustion but 80% of capacity may have caused exhaustion. This data may be used to set a threshold. At block 650, the method may collect at least one of historical and aggregated resource usage data or capacity data over a plurality of instances that the component session is operating to determine whether resource exhaustion is probable. For example, the method may review the situations when multiple-components used a resource. At block 660, if a first resource is dependent on a second resource and resource exhaustion is predicted for the second resource, the method may predict resource exhaustion for the first resource. This is logical as the first resource cannot operate properly without the first resource. At block 670, the method may predict resource exhaustion when resource usage is greater than a certain percentage of available capacity FIG. 7 may illustrate a method of resource management for a computer which may expand on the previous discussion. At block 700, the method may identify one or more causes of resource exhaustion. At block 710, the method may review the identified causes of resources exhaustion. At block 720, the method may identify one or more correctable causes of resource exhaustion. As discussed previously, some causes for resource exhaustion are correctable and some are not. At block 730, the method may identify one or more target components that are identified by trend analysis as being causes of resource exhaustion. At block 740, the method may identify a cause for resource exhaustion by analyzing the results of previous corrective measures taken by the user or negotiated among the components. In an alternative embodiment, the method may examine the components that were operating at or near the instant exhaustion occurred to identify a cause of exhaustion.

Figure 8:
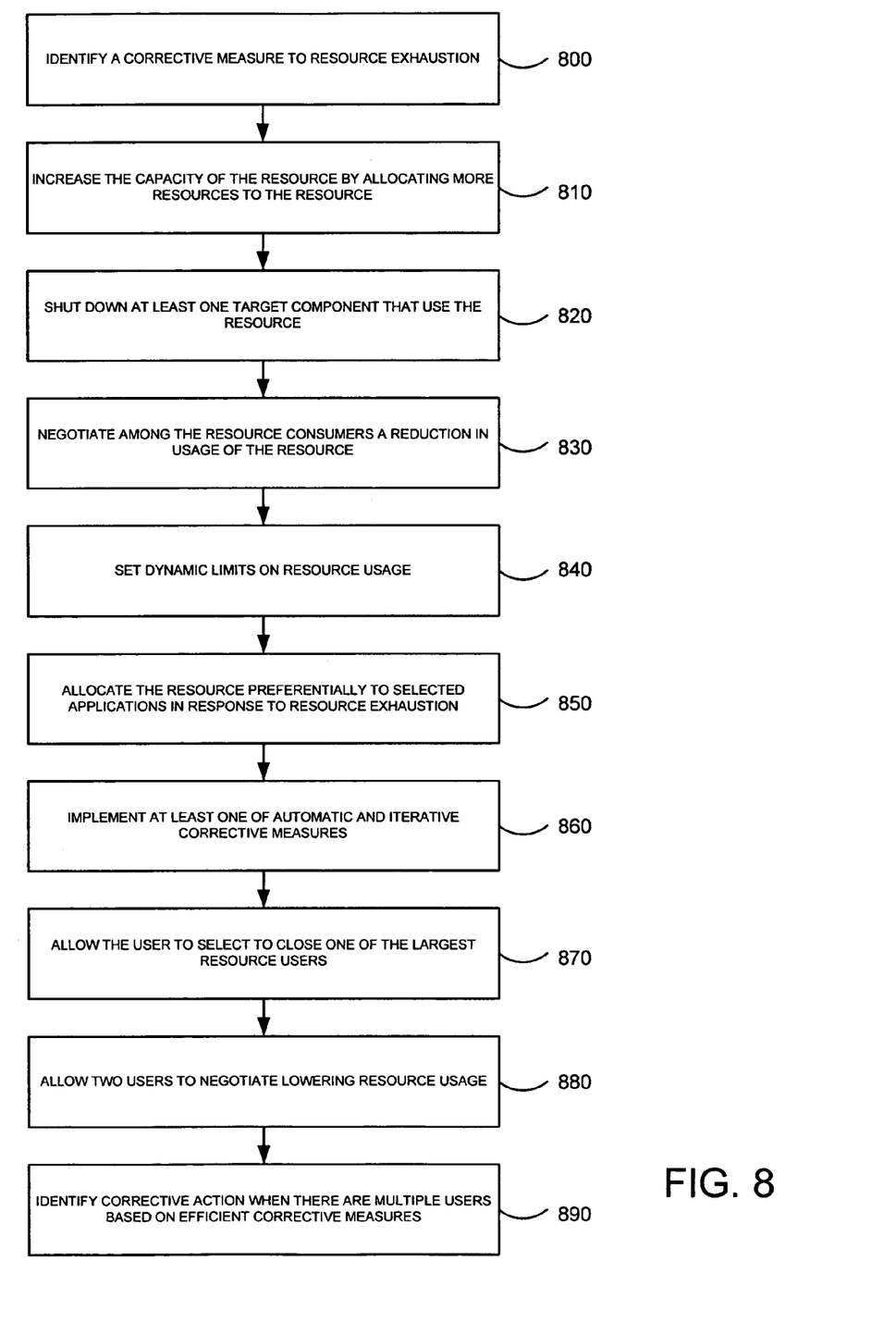
FIG. 8 may be an illustration of a flowchart of a method of determining a corrective measure in response to resource exhaustion.

FIG. 8 may illustrate a method of resource management for a computer. At block 800, if resource exhaustion is detected and one or more correctable probable causes are identified, the method may identify a corrective measure to resource exhaustion. At block 810, the corrective measure may be to increase the capacity of the resource by allocating or requesting additional resources. Another corrective measure may be to update one or more components in the system, automatically or otherwise. Closing target components is another example of a corrective measure. At block 820, the method may close at least one target component that uses the resource. At block 830, the method may negotiate among the resource consumers a reduction in usage of the resource. At block 840, the method may set dynamic limits on resource usage by a target component. At block 850, the method may allocate the resource or deny the resource preferentially to selected components in response to resource exhaustion. At block 860, the method may implement at least one of automatic and iterative corrective measures that provide a preferred amount of user interruption and effective resource relief from exhaustion based on at least one of historical and aggregated results of corrective measures. At block 870, the method may allow the user to select to close one of the largest resource users. At block 880, the method may allow two users to negotiate lowering resource usage. At block 890, the method may automatically identify corrective action when there are multiple users based on efficient corrective measures.

Another corrective action may be to replace one or more parts (for example, compiled application files or configuration settings), of the target components that are identified as the cause for exhaustion. The update may result in a correction in the current session itself, or in subsequent sessions. For example, if the method identifies A.exe to be a cause of resource exhaustion, then the method may check to see if there is an updated binary file or configuration setting, for the application and then install this new version on the user's machine. Other corrective actions are possible.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of resource management of resources in a computer comprising a processor, the computer defining, for respective resources, a configurable percentage comprising a numerical threshold value related to the exhaustion of the specific resource, the method comprising:
monitoring data about at least one of properties of resources and usage of resources by components;
using the data to predict resource exhaustion for the specific resource further comprising identifying when resource exhaustion is probable by:
comparing an exhaustion measure of the specific resource to the configurable percentage; and
if the exhaustion measure for the specific resource is beyond the configurable percentage, reducing usage of at least one cause of the exhaustion of the specific resource by:
identifying a plurality of fast growing contributors to exhaustion for the specific resource;
closing the fast growing contributors to exhaustion for the specific resource; and
notifying a user that the resolution of the exhaustion for the specific resource was successful.

2. A method according to claim 1, further comprising: upon failing to close at least one contributor, notifying a user providing a list of contributors to exhaustion for the specific resource that could not be closed.

3. The method of claim 1, comprising: upon detecting a second near exhaustion event after notifying the user, refraining from notifying the user of the second near exhaustion event.

4. The method of claim 3, the refraining comprising: upon detecting a second near exhaustion event within a designated period of time after notifying the user, refraining from notifying the user of the second near exhaustion event.

5. The method of claim 1, comprising: upon failing to close at least one contributor, notifying the user that the attempt at resolving the resource exhaustion has failed.

6. The method of claim 1, comprising: upon failing to mitigate exhaustion of the resource, presenting to the user at least one recommendation relating to the resource exhaustion.

7. The method of claim 6, the recommendation selected from a recommendation set comprising:
a recommendation to restart the computer;
a recommendation to save work associated with applications using the resource;
a recommendation to close components using the resource; and
a recommendation to request that other users reduce their use of the resource.

8. The method of claim 1, reducing usage of at least one cause of the exhaustion of the specific resource comprising:
presenting to the user at least one option to select at least one components using the resource; and
upon receiving from the user a selection of at least one selected component to be closed, closing the at least one selected component.

9. The method of claim 8:
respective users having a privilege set within the computer; and
asking the user comprising: presenting options to the user depending on the privilege set of the user.

10. The method of claim 1, notifying the user that the resolution of the exhaustion for the specific resource was successful comprising: presenting to the user at least one suggestion for avoiding the exhaustion of the specific resource in the future.

11. The method of claim 10, the at least one suggestion selected from a suggestion set comprising:
a suggestion to increase a capacity of the resource;
a suggestion to add additional resources to the computer;
a suggestion to update at least one component of the computer; and
a suggestion to close processes using the resource.

12. The method of claim 1, identifying the fastest growing contributors to exhaustion for the specific resource comprising: identifying, among the fastest growing contributors to exhaustion for the specific resource, the fastest growing contributors comprising applications that the user is not primarily using.

13. The method of claim 12:
respective consumers comprising a quota allocated for use of the resource; and
the method comprising: upon closing at least one contributor to the resource exhaustion of the resource, reallocating to at least one application that the user is primarily using the quota of the resource allocated to the at least one closed contributor.

14. The method of claim 1, comprising:
generating a trend analysis of a predicted resource exhaustion of the resource, the cause of the resource exhaustion, and results of the resolution of the resource exhaustion; and
presenting the trend analysis to the user.

15. The method of claim 14, generating the trend analysis comprising:
detecting an offline period when the computer is not heavily utilized by the user; and
upon detecting the offline period, generating the trend analysis.

16. The method of claim 1, comprising:
for respective components comprising contributors to the resource exhaustion of the resource, determining availability of an update of the component; and
upon detecting an update of the component, automatically updating the component.

17. The method of claim 1, comprising: upon receiving from the user a request to ignore the resource exhaustion of the resource, ignoring the resource exhaustion of the resource.

18. The method of claim 2, comprising: upon failing to close at least one contributor to the exhaustion of the specific resource:
identifying at least one additional contributor to exhaustion for the specific resource; and
closing the at least one additional contributor.

19. A method of resource management of resources in a computer comprising a processor, the method comprising:
executing on the processor instructions configured to:

for respective resources, define a threshold value related to an exhaustion of the resource;

monitor uses of resources by components;

for respective resources, compare an exhaustion measure of the resource to the threshold value; and if the exhaustion measure for a resource exceeds the threshold value, reduce usage of the resource by:
- identifying a plurality of fast growing contributors to exhaustion for the resource;
- closing the fast growing contributors to exhaustion for the resource; and
- notifying a user that the resolution of the exhaustion for the resource was successful.

20. A computer-readable storage medium comprising instructions that, when executed on a processor of a computer, cause the computer to reduce exhaustion of resources used by processes of the computer by:

for respective resources, defining a threshold value related to an exhaustion of the resource;

monitoring uses of resources by components;

for respective resources, comparing an exhaustion measure of the resource to the threshold value; and if the exhaustion measure for a resource exceeds the threshold value, reducing usage of the resource by:
- identifying a plurality of fast growing contributors to exhaustion for the resource;
- closing the fast growing contributors to exhaustion for the resource; and
- notifying a user that the resolution of the exhaustion for the resource was successful.

* * * * *